United States Patent [19]

Kachinski, Jr.

[11] 4,402,891
[45] Sep. 6, 1983

[54] METHOD OF PROCESSING WASTE CEMENT KILN DUST TO MAKE A SOIL TREATMENT COMPOSITION

[76] Inventor: Joseph L. Kachinski, Jr., 3510 Glenarm Ave., Baltimore, Md. 21206

[21] Appl. No.: 318,033

[22] Filed: Nov. 4, 1981

[51] Int. Cl.³ .............................................. B01J 2/12
[52] U.S. Cl. .................................. 264/40.1; 264/82; 264/117
[58] Field of Search .................... 264/40.1, 82, 117

[56] References Cited

U.S. PATENT DOCUMENTS

| | | | |
|---|---|---|---|
| 3,555,133 | 1/1971 | Gentaz | 264/82 |
| 4,121,942 | 10/1978 | Kato | 264/82 |
| 4,219,515 | 8/1980 | Helsey | 264/82 |

Primary Examiner—James R. Hall
Attorney, Agent, or Firm—Robert K. Youtie

[57] ABSTRACT

The processing for reconditioning of waste cement kiln dust to reuse the valuable metal salts thereof as a combination soil conditioner, liming agent and potassium-enriched fertilizing material, wherein water is admixed with the waste dust in a carbon dioxide-containing atmosphere to primarily reduce the alkalinity of the dust and to secondarily granulate the mixture.

8 Claims, 1 Drawing Figure

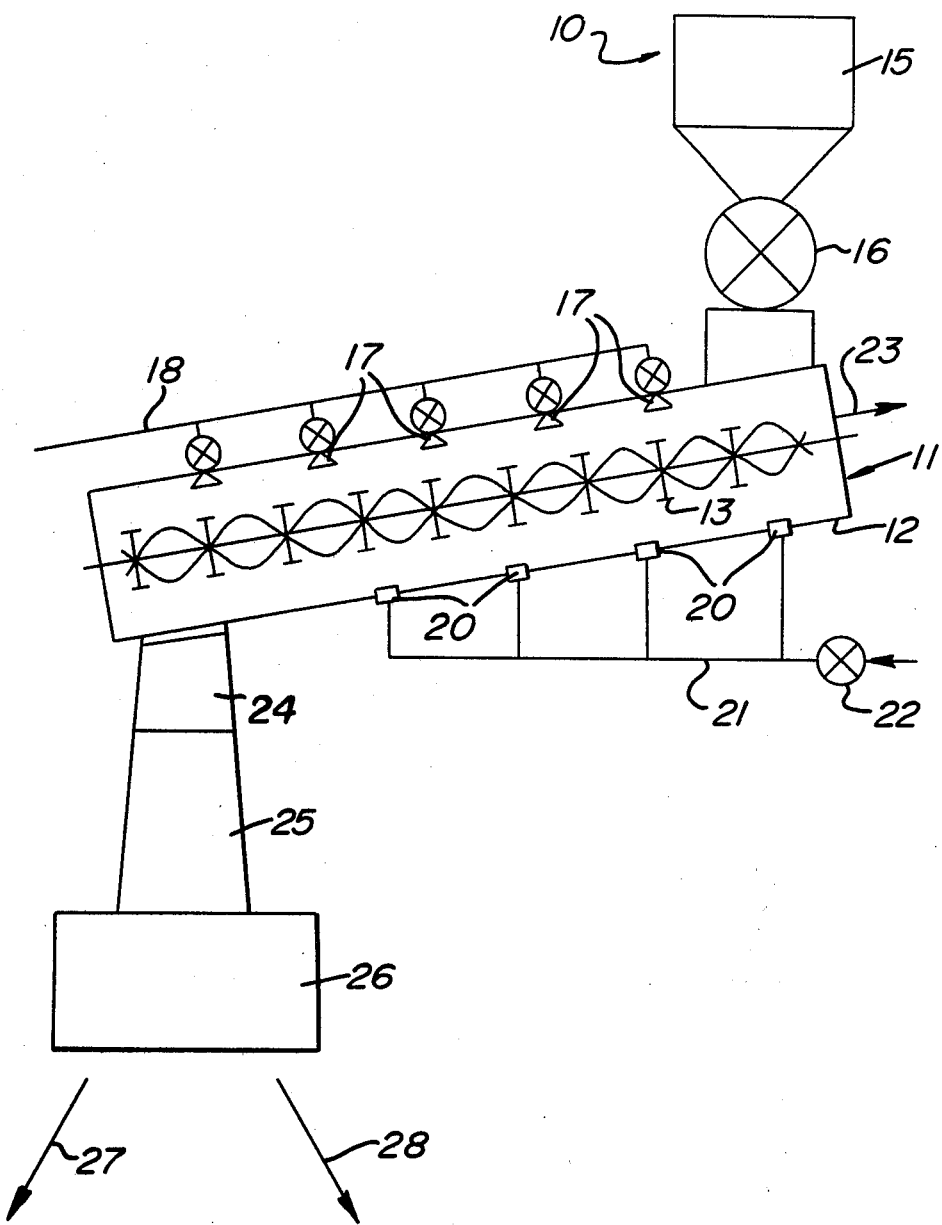

METHOD OF PROCESSING WASTE CEMENT KILN DUST TO MAKE A SOIL TREATMENT COMPOSITION

BACKGROUND OF THE INVENTION

As is well known in the manufacture of cement, there results as waste a kiln dust which heretofore had no economically viable utility, but presented considerable disposal problems and cost.

While there have in the past been proposed certain uses for waste cement kiln dust, such as a soil liming agent in agriculture, a soil stabilizer for road beds and the like, and for reuse in cement manufacture, such proposals have not proved acceptable. For example, as a soil liming agent such waste material is damaging to plant leaves by its high alkalinity and difficult to control because of its fine particle size. In road work and similar construction solubility of the high alkaline waste material is now considered a pollution hazard and is therefore undesirable. Also as an ingredient in the manufacture of cement via recycling, the waste kiln dust has been found to degrade the quality of the resultant cement product.

That neither these nor other acceptable uses have been found for waste cement kiln dust is evidenced by the current building of expensive storage containers, the expensive collecting, transporting, and other handling of the kiln dust, as well as the continuing cost of storage space, and the like. By way of example, a single medium size cement plant generates approximately 100 tons of waste dust per day, or about 30,000 tons per year, so that the continuing and increasing size of this problem may be appreciated.

Applicant is aware of the below listed prior patents in this area of endeavor:

| PATENTEE | U.S. Pat. No. |
|---|---|
| Ponzer | 2,329,940 |
| McCants | 2,605,236 |
| Palonen et al. | 2,871,133 |
| Patzias | 2,991,154 |
| Singleton et al. | 3,925,534 |

Both Ponzer and Palonen et al. propose recycling the kiln dust, Ponzer in a slurry and Palonen by agglomeration under high heat. Singleton et al. also suggests recycling by a slurry, McCants teaches the production of an adsorbent paste, while Patzias teaches the recovery of potassium sulphate.

SUMMARY OF THE INVENTION

It is an important object of the present invention to provide a method of treating waste kiln dust to moderate the alkalinity thereof and granulating the particles to facilitate its handling and application to soil while enabling substantially the entire component composition of the material to be effectively utilized in liming, fertilizing, and soil conditioning. The fertilizing property of the processed dust is not limited solely to the potassium content, but is also derived from the calcium-, magnesium-, iron-, and sulphur-containing compounds, as well as other important trace elements, known to be present in the dust.

It is a further object of the present invention to provide a method wherein the alkalinity of cement kiln dust is moderated by increasing the bicarbonate and carbonate content and thereby decreasing the alkali metal and alkaline earth metal oxide and hydroxide content by admixture with water and a carbon dioxide-containing atmosphere.

The instant invention contemplates by its novel method the provision of a reconditioned waste kiln dust which is of substantial value as an agricultural product without problems of pollution and handling.

The processed granules resulting from the instant method, of any mesh size, have the advantageous and unique characteristic of "breaking down" or disintegrating to the initial fine sized dust particles upon the application of sufficient water to saturate the granules. Application of outside forces, such as caused by tilling, rainstorms, irrigation, etc., insures complete breakdown of these granules.

Other objects of the present invention will become apparent upon reading the following specification and referring to the accompanying drawing which forms a material part of this disclosure.

The invention accordingly consists in the combinations and arrangements of method steps which will be exemplified in the following description and of which the scope will be indicated by the appended claims.

BRIEF DESCRIPTION OF THE DRAWING

The single drawing is a diagrammatic representation of apparatus adapted for use in practice of the instant method.

DESCRIPTION OF THE PREFERRED EMBODIMENTS

Referring now more specifically to the method of the instant invention, the highly alkaline kiln dust may be treated with a fine or atomized spray of water sufficient to produce granules during continuous mixing, kneading, and agitating, and reacting the moistened dust with moist air or carbon dioxide-enriched air or gases until the alkalinity of the dust is substantially reduced. The kiln dust used has no cementitious properties, such dust being more likely to be recycled in the cement manufacturing procedure.

The granules resulting from the instant method are classified to remove those of desired size and the over- or under-sized granules are regranulated. The properly sized resultant granules may be dried and packaged.

More particularly, the processing of the instant invention may include a first stage wherein waste cement kiln dust, as collected in a baghouse or by other means, is treated in a suitably air-tight batch mixing apparatus with water to about 15–25% by weight of the dust. The waste kiln dust may have a typical particle diameter range of between 0.01–100 microns, and is preferably mixed with water to about 20% by weight of the dust. In practice, the water may be directed as a fine or atomized spray onto the exposed surface of waste dust during mixing and agitating of the dust. By metering and pulsing the water spray onto the dust, the mixing process is facilitated. Thorough mixing and kneading of the dust during or after each spraying will prevent balling of or agglomeration due to uneven distribution of the water.

The mixing is preferably of a vigorousness to form granules of a size range to pass through a 16-mesh sieve and be retained on a 120-mesh sieve or advantageously to pass through a 100-mesh sieve. Insufficient vigorous mixing or excess water may result in larger or clay-like granules lacking the desired granularity.

The durability of the final granular product appears to be improved by the addition of water to the limits of workability, in the range of 25-30% of water by weight of dust depending on the characteristics of the dust. This addition of water changes the color of the dust from light grey to darker grey, and the granules retain their "powdery" consistency, but pack easily under compression.

The waste powder or granules may next be aerated, as by aerating inlets in a mixing chamber, say opening upwardly through the material being aerated. Recycling of the aerating air for a period of time maintains the moisture content in the desired range of 15-25% by weight of dust and allows reaction of the alkaline salts of the dust with carbon dioxide present in the air. As the carbon dioxide content is depleted, replacement air may be used.

Alternatively, fresh, water-saturated air can be used on a continuous basis (without recycling) to provide generally constant concentration of carbon dioxide for aeration and substantially prevent change of the moisture content of the material. In practice, cooled cement kiln stack gas may afford a convenient source of carbon dioxide-enriched air.

The carbonation reaction may be complete in 6-24 hours using air; however, the reaction may be essentially complete in 20-60 minutes using a carbon dioxide atmosphere.

The extent of neutralization or moderation of alkalinity is monitored by sampling the material during the course of the reaction and determining the approximate pH of a solution of the waste dust. The pH measurement may be by any desired technique, say a relative measurement as compared to the pH of mildly alkaline bicarbonate salts, if desired.

A later stage of the method is drying of the granules, which is advantageously performed at or below 80° C. At higher drying temperatures, such as conventional drying temperatures of 105°-120° C., there is a partial reversion to increased alkalinity. If desired, waste stack gas may be economically and advantageously utilized in this drying stage by its proportionate mixing with ambient temperature air in order to regulate the final drying temperature.

A typical chemical analysis of waste cement kiln dust is as follows:

| COMPOSITION | PERCENT BY WEIGHT |
|---|---|
| $SiO_2$ | 13% |
| $Al_2O_3$ | 4.5% |
| $Fe_2O_3$ | 1.6% |
| CaO | 39% |
| MgO | 2.2% |
| $SO_3$ | 10% |
| $Na_2O$ | 2% |
| $K_2O$ | 5% |
| Ignition Loss | 21.4% |

However, the typical chemical analysis of waste cement kiln can vary within substantial limits as follows:

| COMPOSITION | PERCENT BY WEIGHT |
|---|---|
| $SiO_2$ | 13-21% |
| $Al_2O_3$ | 2-8% |
| $Fe_2O_3$ | 1-8% |
| CaO | 35-55% |
| MgO | 1-5% |
| $SO_3$ | 1-10% |
| $Na_2O$ | 1-5% |
| $K_2O$ | 1-10% |
| Ignition Loss | 5-25% |

A solution prepared from the original waste kiln dust shows a pH of about 10-11 or greater, while a solution prepared from the same amount of waste kiln dust processed as described above shows a pH of about 8, which is in the range produced by solutions of bicarbonates.

Thus, the appreciable alkaline content of the waste kiln dust found in the forms of calcium oxide and hydroxide, potassium oxide and hydroxide, and sodium oxide and hydroxide is converted to mildly alkaline calcium carbonate, potassium bicarbonate, and sodium bicarbonate.

The chemical analysis of the processed dust is essentially the same as the starting material except the ignition loss increased from 21.4% to 26.4%, which verifies the incorporation of carbon dioxide into the processed dust and usually increases by 5-7% by weight after processing. Analysis by gasometry closely parallels the results from ignition loss. This translates in terms of liming potential, designated by the calcium carbonate equivalent (CCE) and equivalent neutralizing power (ENP), to an increase from 49% CCE for a 21.4% ignition loss to a 60% CCE for a 26.4% ignition loss.

Further, the valuable potassium content of the waste dust is retained in this process, and as is obvious from the above there is no waste water to present an environmental disposal problem.

The availability of the waste dust contents for soil fertilization was demonstrated by subjecting the material to multiple digestions with boiling distilled water. The percent of water-soluble and water-insoluble material was determined to be 38% and 62%, respectively. The percent solubility of each component present in the dust is shown below:

| COMPOSITION | WASTE DUST | EXTRACTED DUST | WT. % INSOLUBLE | WT. % SOLUBLE | PERCENT SOLUBILITY |
|---|---|---|---|---|---|
| $SiO_2$ | 13% | 21% | 13% | 0% | 0% |
| $Al_2O_3$ | 4.6 | 1.7 | 1.1 | 3.5 | 76 |
| $Fe_2O_3$ | 1.6 | 1.3 | 0.8 | 0.8 | 50 |
| CaO | 39 | 38.2 | 23.7 | 15.3 | 39 |
| MgO | 2.2 | 2.0 | 1.2 | 1.0 | 45 |
| $SO_3$ | 10 | 2.9 | 1.8 | 8.2 | 82 |
| $Na_2O$ | 2 | 0.10 | 0.06 | 1.94 | 97 |
| $K_2O$ | 5 | 0.06 | 0.04 | 4.96 | 99 |
| Ignition Loss | 21.4 | 30 | 18.6 | 2.8 | 13 |

Thus is may be seen that 99% of the potassium of the dust as $K_2O$ is available to fertilize soil.

EXAMPLE I

For small scale, batch processing of waste cement kiln dust, 100 g of highly alkaline "baghouse" waste cement kiln dust was placed in a clear, flexible reaction bag having a volume of 10-50 times that of the dust. A bag of sheet plastic was found to be a convenient and effective reaction device having a gastight closure. Water was then added as a fine spray, after which the contents were manually mixed and thoroughly "kneaded", with alternate spraying and mixing to distribute the water and evenly moisten the dust. After the addition of water to about 15–25% by weight of dust (preferably 20%), the color of the dust changed from a very light grey to a much darker shade of grey. The dust retained its "powdery" consistency but packed easily under compression. Vigorous agitation of the bag contents resulted in fine granules retained on a 120-mesh sieve and passed by a 16-mesh sieve, as desired. After completion of this wetting-granulation stage, the reaction bag was then inflated with air and the bag shaken or kneaded to provide intimate mixing of the wetted dust and air. A small sample was removed every hour for alkalinity testing, the bag purged of air and reinflated with fresh air, and the mixing process continued. The pH was tested relative to mildly alkaline bicarbonate salts, and carbonation continued until such a degree of neutralization had been attained, usually 6–24 hours depending on the age and initial pH or the dust. The granules were dried at 50°–80° C. and analysis by gasometry indicated CCE values of 52–60%.

EXAMPLE II

The method of Example I was repeated except that carbon dioxide was used in place of air, which effected an immediate reaction, as evidenced by the evolution of considerable heat. Sampling and analyzing the reaction material every 20 minutes as in Example I, indicated that the reaction was essentially complete after 20 minutes.

EXAMPLE III

The process of Example II wherein 500 g of waste dust was treated and the reaction completed within 30–60 minutes.

APPARATUS

Referring now to the single FIGURE of the drawing, there is shown an apparatus, generally designated 10, which may be used in practice of the instant method. A conventional mixing, granulating or mulling apparatus is generally designated 11, which may include an elongate vessel 12 which may decline in the direction of material movement, as from right to left in the illustrated embodiment. Interiorly of the vessel 12 may be suitable mixing means, such as ribbon agitator means 13.

A dust supply 15 may be located above the upper end of the vessel 12, and communicate through a rotary air lock 16 for passing the starting material dust to the mixing vessel 12.

Along the upper region of the vessel 12 may be provided a plurality of pulsing and metering valves with nozzles, as at 17, connected to a source of water supply, as by conduit means 18. Thus, water may be metered into the vessel 12 and pulsed, as desired.

Along the bottom of the vessel 12 may be a series of gas diffusing inlets 20 connected by conduit means 21 and valving 22 to a suitable source of air or carbon dioxide. By this means the hereinbefore described carbon dioxide-rich atmosphere may be provided by passing air or carbon dioxide through the inlets 20 into the container 12 and upwardly through the material within the container.

At an upper region of the container or vessel 12 there may be provided an outlet 23 for removing and/or recycling (as desired) the gaseous atmosphere of the vessel.

At a lower region of the vessel or container 12 as at the lower left hand end of the vessel shown in the drawing, there may be provided a drying station 24 leading to a processed dust takeoff or removal means 25, which may pass to sieving apparatus 26 which separates the desired particle size granules (as at 27) from the over- and under-sized granules, as at 28. The over- and under-sized granules may be regranulated, if desired.

Of course, other suitable apparatus may be employed, that of the drawing being shown by way of example and without limiting it.

From the foregoing, it will be seen that the instant invention provides a highly effective and inexpensive method for reducing or moderating the high alkalinity of waste cement kiln dust to the level such that the material is converted into a valuable potassium-containing fertilizer and liming agent. In addition, the instant method effects granulation of the dust material without the addition of costly binders or additives. It appears that utilization of a carbon dioxide atmosphere from the cement kiln stack gas would lend itself to a continuous operation effecting substantial savings in equipment and maintenance, while effectively reducing carbon dioxide emissions. Further, relatively small quantities of water are required and waste liquor is not generated.

It will therefore be appreciated that the method of the present invention is extremely suitable and highly economical in practice, environmentally beneficial, and otherwise fully accomplishes its intended objects.

Although the present invention has been described in some detail by way of illustration and example for purposes of clarity of understanding, it is understood that certain changes and modifications may be made within the spirit of the invention.

What is claimed is:

1. In the method of processing waste cement kiln dust to make a soil treatment composition, the steps which comprise: gradually introducing water to the kiln dust; providing a carbon dioxide-containing atmosphere for the dust and water; reacting the water and dust with the carbon dioxide-containing atmosphere for reducing the alkalinity of the water and dust measured as a pH; and mixing, kneading and agitating the dust and water in said atmosphere to form granules of the reduced pH mixture.

2. The method according to claim 1, further comprising the steps of drying the granules at temperature less than 90° C. and separating out granules of a size range to pass through a 16 mesh sieve and be retained on a 120 mesh sieve.

3. The method according to claim 1, wherein the water is introduced by spraying water on to said dust.

4. The method according to claim 1, wherein the carbon dioxide-containing atmosphere is moist air.

5. The method according to claim 1, wherein said mixing, kneading and agitating is performed continuously during the introduction of water to minimize agglomeration of large granules of a size for retention on a 16 mesh sieve.

6. The method according to claim 1, wherein water is introduced sufficient to result in a dust containing approximately 15–30% by weight of water.

7. The method according to claim 1, wherein the reaction of said dust and water with said carbon dioxide-containing atmosphere is stopped when the pH of said water and dust is reduced to a range of about between 7–9.

8. The method according to claim 6, wherein the water is introduced to result in a dust containing approximately 15–30% by weight of water, and further comprising subsequently drying the granules by removing water to result in granules containing approximately 15–25% by weight of water.

* * * * *